United States Patent [19]

Trucco et al.

[11] 4,089,638

[45] May 16, 1978

[54] APPARATUS FOR GASSIFICATION, PREMIXING AND COMBUSTION OF LIQUID FUELS

[76] Inventors: Horacio A. Trucco, 13 Saddler Ct., Huntington Station, N.Y. 11746; Gerald A. Roffe, 3 Markwood La., East Northport, N.Y. 11731

[21] Appl. No.: 709,893

[22] Filed: Jul. 29, 1976

[51] Int. Cl.² ............................................. F23D 11/44
[52] U.S. Cl. ................................. 431/209; 431/41; 431/208; 431/236; 431/242; 431/243; 431/247
[58] Field of Search ................... 431/36, 41, 208, 209, 431/233, 236, 242, 243, 247, 11

[56] References Cited

U.S. PATENT DOCUMENTS

| | | | |
|---|---|---|---|
| 3,024,607 | 3/1962 | Washburn | 431/236 |
| 3,047,054 | 7/1962 | Hunter et al. | 431/209 |
| 3,653,794 | 4/1972 | Shakiba | 431/208 |
| 3,756,764 | 9/1973 | Reichmann | 431/36 X |

*Primary Examiner*—Edward G. Favors

[57] ABSTRACT

This invention relates to improvements in the art of liquid fuel combustion and, more particularly, concerns a method and apparatus for the controlled gassification of liquid fuels, the thorough premixing of the then gassified fuel with air and the subsequent gas-phase combustion of the mixture to produce a flame substantially free of soot, carbon monoxide, nitric oxide and unburned fuel.

8 Claims, 6 Drawing Figures

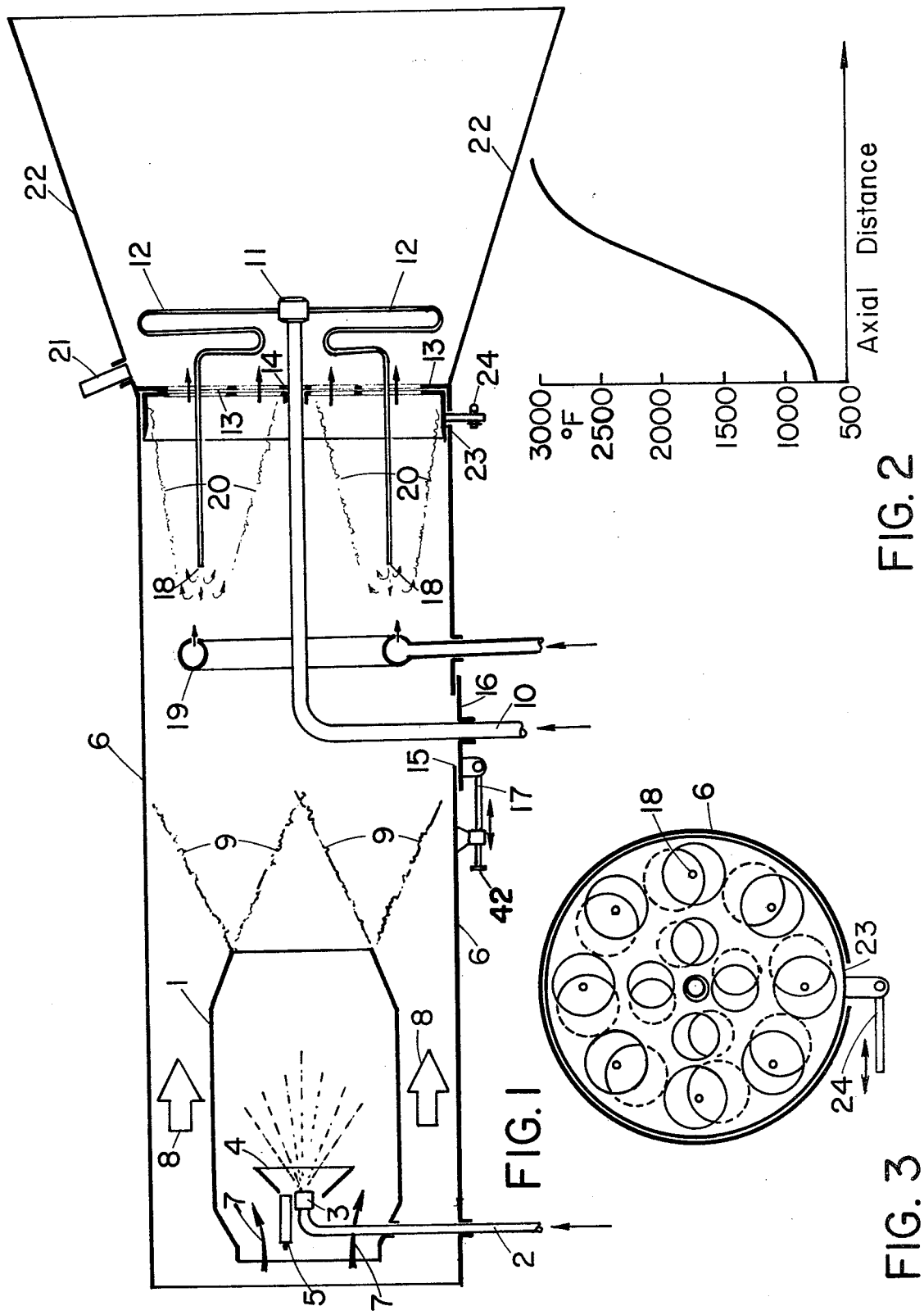

APPARATUS FOR GASSIFICATION, PREMIXING AND COMBUSTION OF LIQUID FUELS

SUMMARY

Conventional combustion systems burn liquid fuels by injecting the fuel into the combustion zone as a finely atomized liquid spray. There, the droplets evaporate and act as a set of distributed fuel sources. Each evaporating droplet within the high temperature combustion zone is surrounded by a thin reaction shell within which most of the oxidation reactions take place. The fuel rich areas surrounding each droplet are a source of considerable carbon monoxide and free carbon. The complete removal of these undesirable species, which requires very careful control of the post flame mixing and quenching rates, is difficult to accomplish. This is sometimes done by using an amount of air considerably in excess of that required for stoichiometric combustion. In certain systems, the use of such quantities of excess air substantially decreases the thermodynamic efficiency.

The use of burning droplet sprays entails other penalties as well. The near stoichiometric conditions in the droplet reaction shells produce extremely high local temperatures and result in the formation of excessive levels of nitric oxide, an undesirable pollutant. In addition, the ability of larger droplets to penetrate the combustion zone without completing evaporation is a major source of unburned fuel species, another undesirable pollutant.

The pre-gassification of liquid fuels provides a mechanism to avoid the undesirable aspects of droplet combustion. Moreover, premixing of gassified fuel with air to produce a uniform mixture for subsequent combustion has been shown to be a highly effective method of achieving high combustion efficiency with extremely low levels of soot, carbon monoxide, nitrogen oxides and unburned fuel species emissions.

Many of the most commonly used fuels, such as heavy hydrocarbons, display physical and chemical properties which require great care in the implementation of a pregassification and premixing process. For example, complete gassification of commercial number 2 heating oil requires that the fuel temperature be raised to approximately 650° F. Further increases in temperature simply assure the gassified state of the fuel. However, at temperatures as low as 900° F, the gassified fuel begins to break down chemically forming molecules of both higher and lower molecular weight than that of the original fuel. The new heavy molecules are highly undesirable components as they cause clogging of the gassifier fuel passages and produce high particulate emission levels when they burn. Thus, the range of temperature available for the gassification process is quite narrow and requires very careful control.

The chemical breakdown (pyrolysis) limit on fuel gassification temperature leads to a second important problem. Although the fuel may be pregassified, its heat content is insufficient to prevent some degree of recondensation if it is mixed with a stream of colder air. Although this partial recondensation results in extremely fine fog-like liquid droplets, the combustion properties of the system are degraded in comparison with the all gas-phase process. In addition, agglomeration can take place within the fog to produce larger droplets still and fuel can condense along the walls of the apparatus further degrading the combustion characteristics of the system.

It is an object of this invention to provide a means for the controlled gassification of liquid fuels, wherin the temperature of the fuel can be accurately maintained within prescribed limits. It is a further object of this invention to provide a mechanism to thoroughly mix gassified fuel with air prior to combustion which, although allowing thorough mixing, precludes the possibility of fuel recondensation.

Other objects and advantages will further become apparant herinafter and in the drawings in which:

FIG. 1 is a view in side elevation of a machine constructed in accordance with this invention employing a preheater for combustion air and an auxillary supply of gaseous fuel to be used during the starting process;

FIG. 2 illustrates a typical axial temperature distribution in the combustion zone of this invention;

FIG. 3 is a front view of a flameholder employed in this device;

Figure 4:
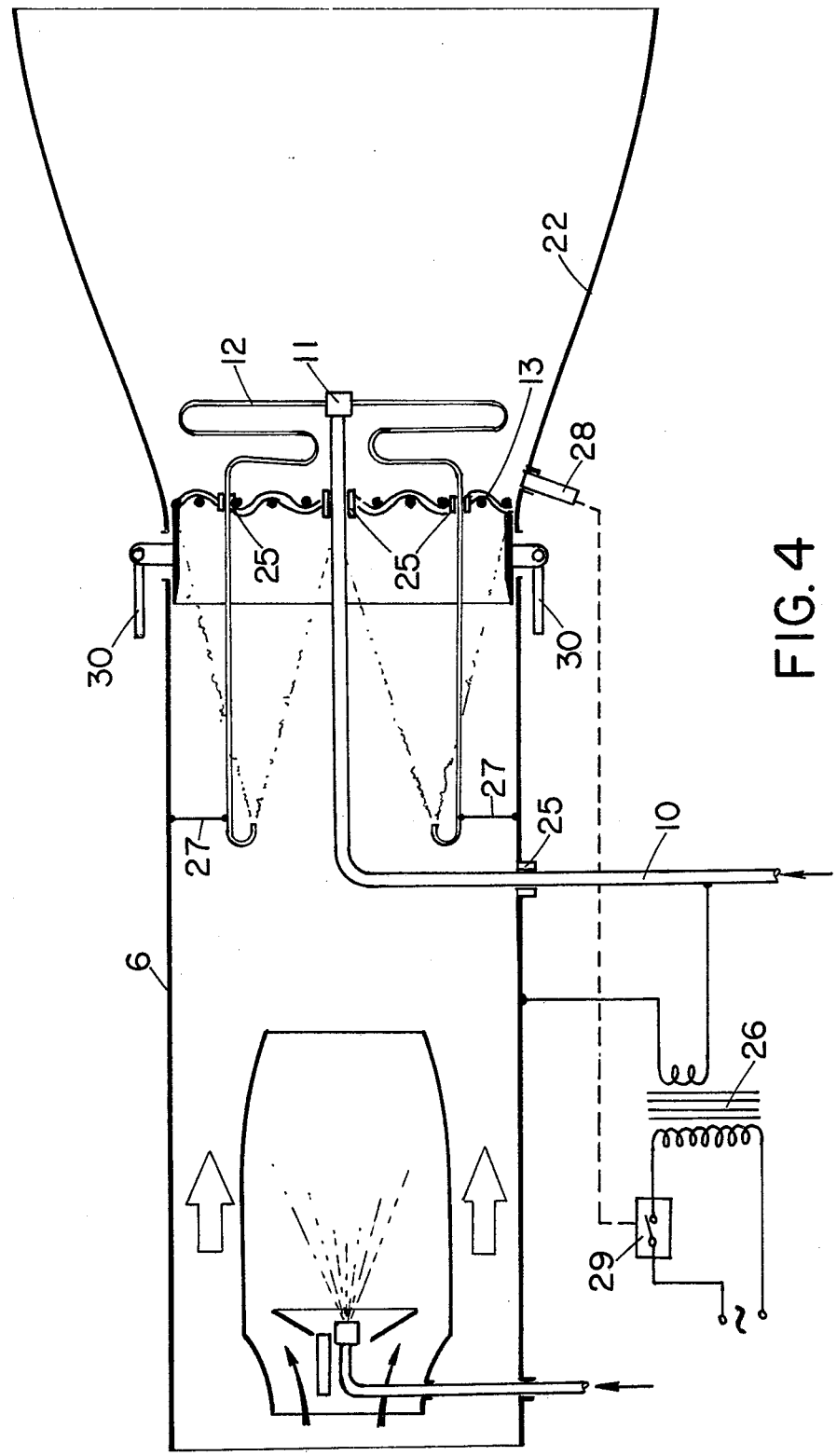
FIG. 4 illustrates the application of electrical fuel gassification to accomplish starting of the device.

In describing the preferred embodiments of this invention illustrated in the drawings, specific terminology will be used for the sake of clarity. However, it is not intended to be limited to the specific terms so selected and it is to be understood that each specific term includes all technical equivalents which operate in a similar manner to accomplish a similar purpose. Moreover, the terms "air" or "combustion air" may be taken to cover any oxidizing gaseous medium.

In the preferred form of the apparatus illustrated in FIG. 1, a conventional liquid fuel combustion heater assembly comprised of a casing 1, fuel supply line 2, fuel atomizing nozzle 3, flameholder 4, and igniter 5, is mounted within an elongated outer casing 6. The main fuel supply tube 10 brings liquid fuel to the distributing plug 11 from which it enters a plurality of gassification tubes 12. The gassification tubes are positioned adjacent to the downstream side of a flameholder 13 which supports the fuel supply tube 10 by means of a slip collar 14. The fuel supply tube 10 passes through slot 15 which is sealed by sliding flange 16. Axial movement of the fuel supply tube 10 is affected by motion of the rod 17. The gassification tubes 12 pass through the flameholder 13 and terminate at a set of injection orifices 18. The apparatus is provided with an injection ring 19 through which an auxillary supply of gaseous fuel can be injected.

In operation, combustion air from a fan, compressor or other source, not shown, enters the apparatus and is divided into two streams 7 and 8. Stream 7 is heated by combustion in casing 1 and mixes with the main airstream 8 in region 9. The temperature of the mixed preheated air is controlled by varying the amount of fuel supplied by line 2. The distance between the end of the preheater casing 1 and the injecting ring 19 is selected so as to produce a uniform temperature distribution at the ring station.

Fuel flows through the main supply tube 10 into the gassification tubes 12 where it is gassified prior to injection into the preheated air stream through orifices 18. Mixing takes place in region 20 and the length of this region is selected so as to produce a uniform mixture at the flameholder 13. The uniform mixture of fuel and air is ignited by a conventional igniter 21 and burns within the combustion duct 22 anchored by flameholder 13.

FIG. 2 illustrates a typical axial distribution of temperature in the combustion duct 22 starting at the flameholder station. Typical of premixed gas phase combustion processes, the temperature is uniform in planes normal to the combustion zone axis and increases monotonically with distance from the flameholder. As a result, the heat transfer rate to the gassification tubes 12 increases as the axial distance between the tubes 12 and the flameholder 13 increases. This invention exploits this phenomenon by allowing for axial motion of the fuel delivery tube-gassification tubing assembly which is moved forward by rod 17 either to provide an increased flow rate of gassified fuel at a constant temperature or to increase the delivery temperature of a fixed flow rate of fuel. The maximum distance which the gassification tubes 12 can be moved forward of the flameholder 13 is restricted by the stop 42 attached to rod 17. The purpose of this restriction is to limit the maximum skin temperature of the gassification tubes 12 to below 1200° F so as to preclude cracking of unburned fuel species which contact the tube surfaces and the consequent formation of soot.

The apparatus is started by admitting a supply of auxillary gaseous fuel through the distribution ring 19 which mixes with the heated combustion air. The mixture is lit by the igniter 21 and forms a premixed flame anchored to the flameholder 13. Simultaneously, a small flow of liquid fuel is passed through the gassification tubes 12. As the thermal inertia of the system is overcome and the gassification process begins, the flow rate of liquid fuel is gradually increased and a corresponding decrease is made in the flow of auxillary gaseous fuel. The process continues until the system is fed entirely by the liquid fuel supply.

The provision to preheat the combustion air prevents fuel recondensation during mixing in region 20 at lower fuel injection temperatures than would be possible if air preheating were not employed. For example, commercial number 2 heating oil can be gassified by heating to a temperature of approximately 650° F. Mixing this gassified fuel with 650° F air will result in a mixture temperature of 650° F and the fuel in this mixture will clearly not condense. However, if this 650° F gaseous fuel were to be mixed with unheated air, the mixture temperature would be approximately 200° F at which condition a sizable fraction of the fuel will recondense, substantially degrading the combustion characteristics of the system.

Recondensation can be avoided by any mechanism which results in a final fuel-air mixture temperature high enough so that the vapor pressure of the fuel at that temperature is greater than its partial pressure in the actual mixture. One way of accomplishing this would be to increase the temperature at which the gassified fuel is injected to approximately 1200° F and mix with unheated air. However, bringing commercial heating oils to temperatures in excess of 900° F causes them to break down chemically (pyrolyze) forming undesirable species which can both clog the fuel lines and degrade the combustion characteristics of the system. By preheating the combustion air, undesirable recondensation is avoided without the necessity of overheating the gassified fuel.

As with any premixing combustion device, it is necessary to provide a mechanism to prevent flashback of the flame from the combustion duct 22 into the premixing region 20. This function is accomplished by the flameholder 13 which creates an area constriction and increases the local velocity above the flashback limit. In order to maintain this condition over a wide range of firing rates, it is necessary to provide a means of varying the flameholder constriction ratio. This is accomplished using the flameholder design concept illustrated in FIG. 3.

The flameholder is comprised of two perforated discs, the perforation patterns on each being identical. The downstream disc remains stationary with respect to the outer casing 6. The upstream disc is mounted in a cylinder 23 which can be rotated by movement of the rod 24. Positioning the discs to produce alignment of the perforations produces the minimum area constriction, which is employed at the maximum firing rate. Rotation of the upstream disc increases the area constriction and allows operation at lower firing rates without flashback.

Another embodiment of this invention is illustrated in FIG. 4 where the combustion air is again preheated by a combustion heater. However, in this embodiment, electric means is employed to generate the heat necessary to accomplish fuel gassification during the starting transient. In this case, the fuel delivery tube 10 and gassification tubes 12 are supported by collars 25 which electrically insulate them from the grounded outer casing 6. The gassification tubes 12 are constructed to provide a high electrical resistivity. During the starting transient, an electric current from transformer 26 is passed through the liquid fuel delivery tube 10, fuel gassification tubes 12 and grounding straps 27 completing the electric circuit through the outer casing 6. The high electrical resistivity of gassification tubes 12 causes them to be heated by the electric current, gassifying the liquid fuel passing through them. The gassified fuel mixes and burns as described earlier. Once a flame is detected in the combustion duct 22 by sensor 28, the relay 29 interupts the electrical supply to the transformer 26 terminating electrical fuel gassification.

In this embodiment, control of the axial distance between the flameholder 13 and gassification tubes 12 is accomplished by means of rods 30 which move the flameholder axially while liquid fuel supply tube 10, distribution plug 11 and fuel gassification tubes 12 remain fixed with respect to casing 6.

Figure 5:
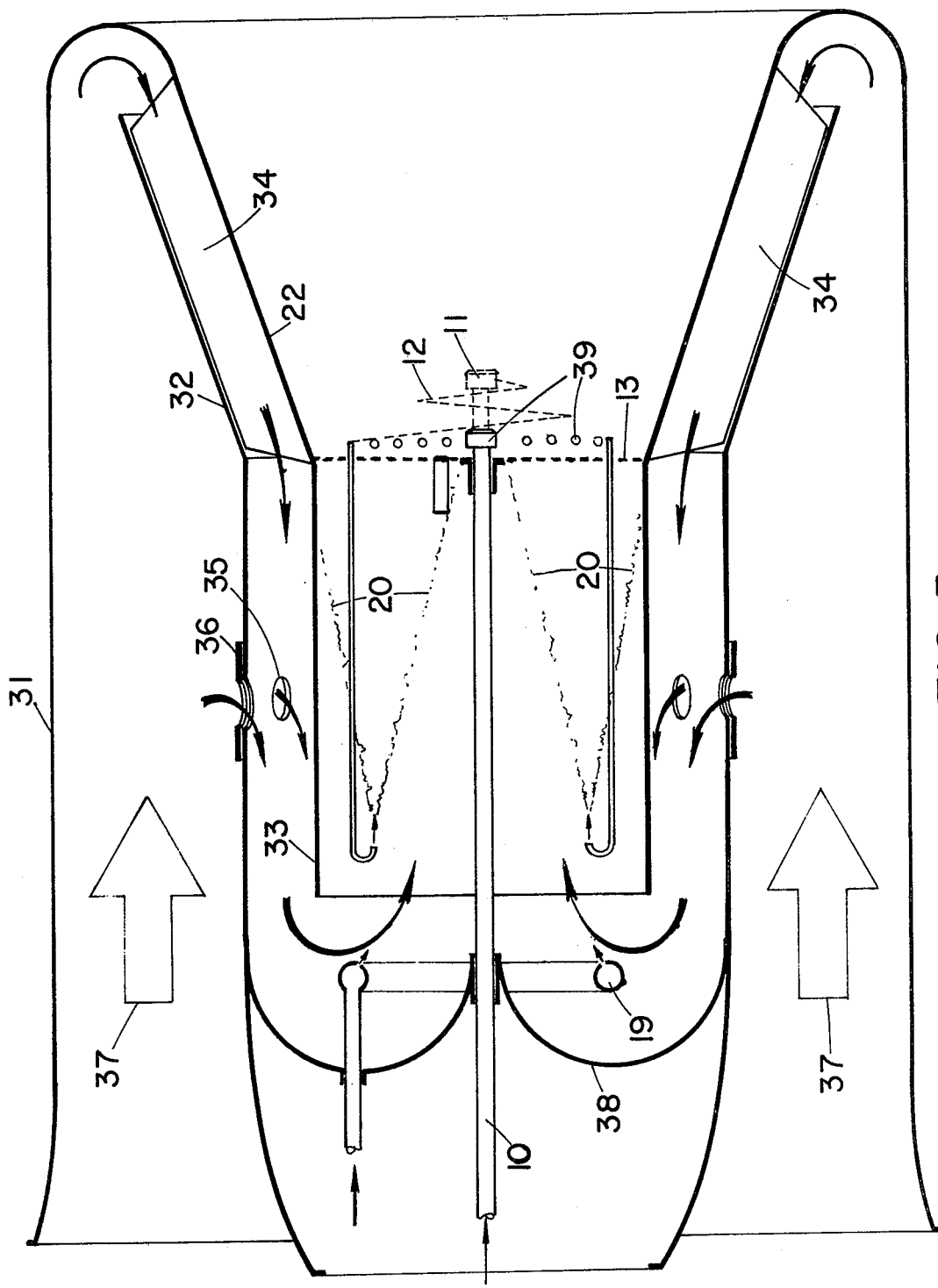
FIG. 5 illustrates an embodiment of this invention employing a regenerative system to preheat the combustion air and an auxillary supply of gaseous fuel to be used during the starting process.

FIG. 5 illustrates another embodiment of this invention wherin the combustion air is preheated in a regenerative manner. In this case, the device is constructed using an outer casing 31 an intermediate casing 32 and an inner casing 33. A plurality of fins 34 are placed in good thermal contact with the combustion duct 22 and span the gap between it and the inner casing 32. A circumferential distribution of holes 35 in the intermediate casing 32 are covered by a ring 36 containing an identical distribution of holes.

In operation, unheated combustion air 37 enters the device and flows between the outer casing 31 and intermediate casing 32. This air then passes through the regenerative heat exchange section formed by combustion duct 22, fins 34 and intermediate casing 32, becoming heated in the process.

The heated air flows between the intermediate casing 32 and the inner casing 33 being turned at the baffle 38 to flow through the inner casing 33 to the flameholder 13. The temperature of the preheated combustion air is controlled by adjusting the position of ring 36 relative to holes 35 so that a portion of the unheated combustion air 37 bypasses the regenerative heat exchange section. Liquid fuel flows from supply line 10 through distribution plug 11 and fuel gassification tubes 12 and is injected through orifices 18 into the preheated combustion air, mixing in zone 20 prior to passage through flameholder 13. Heat transfer from the burning gasses anchored to flameholder 13 provides the heat to gassify the liquid fuel.

In this embodiment, the gassification tubes 12 are wound in a helical pattern moving outward from the distribution plug 11. Axial movement of the fuel delivery tube 10 moves the distribution plug 11 altering the local heat transfer rate. However, the gassification tubes 12 are fixed in position by attachment to the flameholder 13. As a result, the heating rate is increased over the portion of the gassification tubes carrying high heat capacity liquid but not over the portion of the gassification tubes carrying lower heat capacity gassified fuel.

During the starting transient, the distribution plug 11 and fuel gassification tubes 12 are retracted to starting position 39 against flameholder 13. An auxillary supply of gaseous fuel is introduced through injection ring 19. This fuel mixes with the yet unheated combustion air and burns in the combustion duct 22. The heat from this combustion raises the temperature of the regenerative heat exchange section to its operating level. Once this accomplished, the gassification tubes are moved forward to their normal operating position and liquid fuel is gradually fed through the supply tube 10. As the liquid fuel feed rate is gradually increased, the supply of auxillary gaseous fuel injected through ring 19 is gradually reduced. The process continues until the system is fed entirely by the liquid fuel supply.

Figure 6:
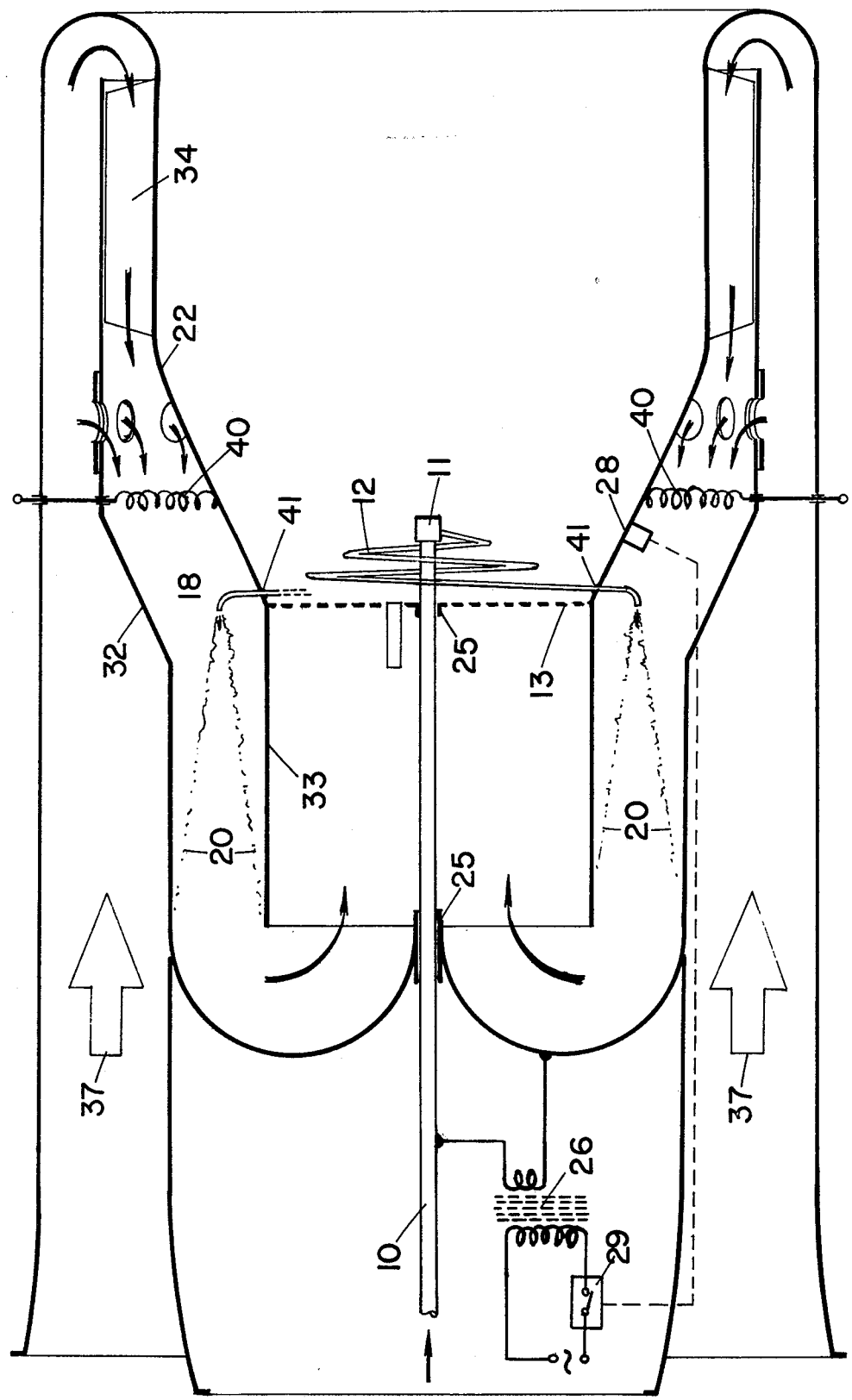
FIG. 6 illustrates the use of electric resistance heating to accomplish both fuel gassification and combustion air preheating during the starting transient.

FIG. 6 illustrates yet another embodiment of this invention wherin an electric preheat system is used in place of the auxillary supply of gaseous fuel during the starting transient. In this case, a thermostatically controlled electrc resistance heater 40 is placed within the air delivery passage to preheat the combustion air to a preset level. The heat to begin fuel gassification is provided by passing an electric current supplied by transformer 26 through the fuel delivery tube 10 and gassification tubes 12 which are supported by electrically insulating sleeves 25. The gassification tubes 12 are grounded at the point 41 where they penetrate the combustion duct 22 and the electric circuit closes through the casing of the apparatus. Gassified fuel is injected into the passage between casings 32 and 33 to maximize mixing length and provide a uniform mixture for combustion at flameholder 13.

In operation, the electrical preheat elements are energized until the proper temperatures are achieved in the gassification tubes 12 and the combustion airstream. At that point, liquid fuel flow is initiated and combustion begins. Flame sensor 28 detects the establishment of a flame in combustion duct 22 and causes relay 29 to interupt power to transformer 26 terminating electric fuel gassification. Power to the electric resistance air preheater 40 is terminated automatically by a thermostat as heat exchange fins 27 achieve their normal operating temperature.

The advantages of this invention are numerous. By converting liquid fuel to gas phase and thoroughly premixing it with air while preventing recondensation prior to combustion, a clear blue-white flame is produced which is free of carbon and unburned fuel species. As a result, the apparatus can be used in any application where clean combustion products are required such as any process currently restricted to the use of gaseous fuels. Further, the device may be operated with very little excess air (typically 2% to 5%) under which conditions the thermodynamic efficiency of the process in which it is employed will be optimized. Further still, when operated with moderate levels of excess air (typically 10% to 20%) the premixed combustion process produces extremely low levels of nitrogen oxides, carbon monoxide and unburned fuel species, all undesirable air pollutants.

It is to be understood that the form of the invention herewith shown and described is to be taken as a preferred embodiment. Various changes and modifications may be made without departing from the spirit of this invention and the scope thereof as defined in the following claims.

What we claim is:

1. A combustion apparatus comprising, in combination, an outer casing, combustion air supply means, liquid fuel supply means, fuel gassification means disposed within the combustion region of the apparatus so as to utilize the heat liberated by combustion to accomplish gassification of the liquid fuel, means to deliver and inject the effluent from said gassification means into a stream of preheated air, a fuel/air premixing duct, flameholder means disposed upstream of said fuel gassification means, means to vary the position of said fuel gassification means relative to said flameholder means, means to preheat the combustion air, ignition means and means to deliver and inject gaseous fuel into the combustion air to start the process.

2. The apparatus of claim 1 and wherein fuel gassification means consists of a coil or grid of tubing disposed within the combustion region downstream of a flameholder means such that fuel moves progressively toward the flameholder means as it flows through said coil or grid.

3. The apparatus of claim 1 and wherin the flameholder means consists of two adjacent parallel perforated plates, the perforation patterns being such that rotation of the plates relative to one another can bring the hole patterns into complete alignment or complete or partial misalignment.

4. The apparatus of claim 1 and wherin the temperature of the gassified fuel is controlled by axial movement of the fuel gassification means relative to the flameholder means.

5. A combustion apparatus comprising, in combination, outer, intermediate and inner casings disposed such that combustion air flows from a passage formed between said outer and intermediate casings into a passage formed by said intermediate and inner casings, air supply means, liquid fuel supply means, fuel gassification means disposed within the combustion region of the apparatus so as to utilize heat liberated by combustion to accomplish liquid fuel gassification, means to deliver and inject the effluent from said gassification means into the combustion air stream, a fuel-air premixing duct, regenerative heat exchange means located between said combustion duct and intermediate casing to preheat the combustion air stream, a fuel-air premixing duct, flameholder means disposed upstream of said fuel gassification means, means to vary the position of said flameholder means relative to said fuel gassification means, ignition means, means to electrically preheat the combustion air, thermostat means to control said combustion air preheating, means to electrically insulate said liquid fuel supply means and fuel gassification means from said flameholder means, delivery tube grounding means to make electrical contact between the ends of said delivery tubes and said inner casing, means to supply and regulate the electric current flowing through said gassification means and means to allow a portion of the combustion air to bypass said regenerative heat exchange section.

6. A combustion apparatus comprising, in combination an outer casing, combustion air supply means, means to preheat combustion air, liquid fuel supply means, electrically conductive fuel gassification coils disposed downstream of a flameholder means, a plurality of delivery tubes to bring gassification fuel from said gassification coils and inject it into said preheated combustion air upstream of said flameholder means, a fuel/air premixing duct, means to electrically insulate said liquid fuel supply means and fuel gassification coils from said outer casing, delivery tube grounding means to make electrical contact between the ends of said delivery tubes and said outer casing, and means to supply and regulate an electrical current through said liquid fuel supply means, and ignition means.

7. A combustion apparatus comprising, in combination, outer, intermediate and inner casings disposed such that combustion air flows from a passage formed between said outer and intermediate casings into a passage formed by said intermediate and inner casings, air supply means, liquid fuel supply means, fuel gassification means disposed within the combustion region of the apparatus so as to utilize heat liberated by combustion to accomplish liquid fuel gassification, means to deliver and inject the effluent from said gassification means into the combustion air stream, a fuel/air premixing duct, regenerative heat exchange means located between said combustion duct and intermediate casing to preheat combustion air stream, flameholder means disposed upstream of said fuel gassification means, means to vary the position of said fuel gassification means relative to said flameholder means, ignition means, means to allow a portion of the combustion air to bypass the regenerative heat exchange section, and means to supply and inject gaseous fuel into the combustion air stream to start the process.

8. The apparatus of claim 6 and wherein the temperature of the gassified fuel is controlled by axial movement of the flameholder means relative to the fixed position fuel gassification means.

* * * * *